United States Patent
Freeman et al.

[11] Patent Number: 5,756,959
[45] Date of Patent: May 26, 1998

[54] COOLANT TUBE FOR USE IN A LIQUID-COOLED ELECTRODE DISPOSED IN A PLASMA ARC TORCH

[75] Inventors: Jennifer L. Freeman; Zhipeng Lu; Richard W. Couch, Jr., all of Hanover; Roger L. Kenyon, Lebanon, all of N.H.

[73] Assignee: Hypertherm, Inc., Hanover, N.H.

[21] Appl. No.: 738,723

[22] Filed: Oct. 28, 1996

[51] Int. Cl.⁶ .................................................. B23K 10/00
[52] U.S. Cl. ............... 219/121.49; 219/75; 219/121.52; 219/119; 313/231.31
[58] Field of Search ............... 219/119, 121.49, 219/121.52, 121.48, 74, 75; 313/231.31, 231.41

[56] References Cited

U.S. PATENT DOCUMENTS 3,818,174  6/1974  Camacho ........................ 219/121.49
4,650,956  3/1987  Marchic et al. ................. 219/121.59
5,416,296  5/1995  Walter ............................. 219/121.5

Primary Examiner—Mark H. Paschall
Attorney, Agent, or Firm—Testa, Hurwitz & Thibeault, LLP

[57] ABSTRACT

A coolant tube for a liquid-cooled electrode disposed a plasma arc torch does not become damaged during an electrode blow-out condition. The coolant tube includes a hollow member and a substantially solid member. The hollow member has a first end, a second end and a coolant passage extending between the first and second ends. The first end can be secured within the torch such that the coolant tube is disposed adjacent the interior surface of the electrode and such that the coolant passage is in fluid communication with a coolant supply. The substantially solid member extends from the second end of the hollow member and has at least one flow restriction orifice extending therethrough. Each flow restriction orifice is fluid communication with the coolant passage for providing at least one high velocity jet of coolant to the interior surface of the electrode.

20 Claims, 5 Drawing Sheets

| WATER TUBE | ELECTRODE | CURRENT (AMPS.) | CYCLE TIME | # OF STARTS | PIT-DEPTH (IN.) |
|---|---|---|---|---|---|
| PRIOR ART | HOLLOWMILL | 100 | 4 SEC. | 600 | 0.053 |
| PRIOR ART | NO HOLLOWMILL | 100 | 4 SEC. | 600 | 0.057 |
| HYJET | NO HOLLOWMILL | 100 | 4 SEC. | 600 | 0.034 |
| HYJET | NO HOLLOWMILL | 100 | 4 SEC. | 600 | 0.030 |
| PRIOR ART | HOLLOWMILL | 100 | 60 SEC. | 180 | 0.041 |
| PRIOR ART | NO HOLLOWMILL | 100 | 60 SEC. | 180 | 0.053 |
| HYJET | NO HOLLOWMILL | 100 | 60 SEC. | 180 | 0.045 |
| HYJET | NO HOLLOWMILL | 100 | 60 SEC. | 180 | 0.030 |

FIG. 3

| WATER TUBE | ELECTRODE | CURRENT (AMP.) | CYCLE TIME | DAMAGE |
|---|---|---|---|---|
| PRIOR ART | HOLLOWMILL | 100 | 4 SEC. | YES |
| PRIOR ART | NO HOLLOWMILL | 100 | 4 SEC. | YES |
| HYJET | NO HOLLOWMILL | 100 | 4 SEC. | NO |
| HYJET | NO HOLLOWMILL | 100 | 4 SEC. | NO |
| PRIOR ART | HOLLOWMILL | 100 | 60 SEC. | YES |
| PRIOR ART | NO HOLLOWMILL | 100 | 60 SEC. | YES |
| HYJET | NO HOLLOWMILL | 100 | 60 SEC. | NO |
| HYJET | NO HOLLOWMILL | 100 | 60 SEC. | NO |

FIG. 4

COOLANT TUBE FOR USE IN A LIQUID-COOLED ELECTRODE DISPOSED IN A PLASMA ARC TORCH

FIELD OF THE INVENTION

The invention relates generally to the field of plasma arc torch systems and processes. In particular, the invention relates to a coolant tube for use in a liquid-cooled electrode disposed in a plasma arc torch.

BACKGROUND OF THE INVENTION

Plasma arc torches are widely used in the cutting of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. Gases used in the torch can be non-reactive (e.g. argon or nitrogen), or reactive (e.g. oxygen or air). The torch produces a plasma arc, which is a constricted ionized jet of a plasma gas with high temperature and high momentum.

There are two widely used techniques for generating a plasma arc. One technique uses a high frequency, high voltage (HFHV) signal coupled to a DC power supply and the torch. The other technique for generating a plasma arc is known as contact starting. One form of contact starting can be found in U.S. Pat. Nos. 4,791,268 and 4,902,871, assigned to Hypertherm, Inc.

Using either starting technique, a pilot arc is first generated between the electrode (cathode) and the nozzle (anode). The pilot arc ionizes gas passing through the nozzle exit orifice. After the ionized gas reduces the electrical resistance between the electrode and the workpiece, the arc transfers from the nozzle to the workpiece. The torch is operated in this transferred plasma arc mode, which is characterized by the conductive flow of ionized gas from the electrode to the workpiece, for the cutting of the workpiece.

Plasma arc cutting torches produce a transferred plasma arc with a current density that is typically in the range of 20,000 to 40,000 amperes/in$^2$. High definition torches are characterized by narrower jets with higher current densities, typically about 60,000 amperes/in$^2$. High definition torches produce a narrow cut kerf and a square cut angle. Such torches also have a thinner heat affected zone and are more effective in producing a dross free cut and blowing away molten metal.

High definition plasma arc torches often include a liquid-cooled electrode. One such electrode is described in U.S. Pat. No. 5,310,988, assigned to Hypertherm, Inc. The electrode is formed of copper and includes a cylindrical insert of high thermionic emissivity material (e.g., hafnium or zirconium) which is press fit into a bore in the bottom end of the electrode. The exposed end face of the insert defines an emission surface. Typically, the emission surface is initially planar. However, the emission surface may be initially shaped to define a recess in the insert as described in U.S. Pat. No. 5,464,962, assigned to Hypertherm, Inc. In either case, the insert extends through the bore in the bottom end of the electrode to a circulating flow of cooling liquid disposed in the hollow interior of the electrode. The electrode is "hollowmilled" in that an annular recess is formed in a interior portion of the bottom end surrounding the insert. A coolant inlet tube having a hollow, thin-walled cylindrical body defining a large cylindrical opening extending through the body is positioned adjacent the hollow interior surface of the electrode. The tube extends into the recess in a spaced relationship to provide a high flow velocity of coolant over the interior surface of the electrode.

For high amperage cutting, the tube must remove the heat from the electrode by providing sufficient cooling to obtain acceptable electrode life. It has been determined that if the spacing between the tube and the interior portion of the bottom end of the electrode is too large, the tube does not sufficiently cool the insert. It has also been determined that if the internal surface of the bottom end of the electrode is endmilled (i.e., a planar surface), the electrode life is unacceptably low. Thus, the tube is positioned in a hollowmilled annular recess adjacent the interior portion of the bottom end of the electrode. This hollowmilled electrode configuration provides an acceptable level of cooling of the insert.

Repeated use of such an electrode in a plasma arc torch causes the insert material to wear away, thereby forming a pit of increasing depth in the bore. When insert has formed a pit of sufficient depth (i.e., a substantial amount of the insert material has worn away), a "blow-out condition" occurs. A blow-out condition is defined as the rapid ejection of insert material and the creation of a "through hole" in the bottom end of the electrode. The through hole can be an opening formed in the bore by the ejection of insert material or formed through the bottom end of the electrode near the bore. In either case, the arc attaches to the tube during a blow-out condition due to the proximity of the tube to the interior surface of the bottom end of the electrode. The tube becomes damaged by the arc and requires replacement.

It is therefore a principal object of this invention to provide a tube for a liquid-cooled electrode that does not become damaged during a blow-out condition.

Another principal object of the invention is to provide a tube for a liquid-cooled electrode that maintains or improves electrode life.

Yet another principal object of the invention is to provide a tube for a liquid-cooled electrode that improves manufacturability of such an electrode.

SUMMARY OF THE INVENTION

The present invention features a coolant tube for a liquid-cooled electrode disposed in a plasma arc torch does not become damaged during an electrode blow-out condition. The coolant tube includes a hollow member and a substantially solid member. The hollow member is thin-walled and can be generally cylindrical. The hollow member has a first end, a second end and a coolant passage extending between the first and second ends. The first end is secured within the torch such that the coolant tube is disposed adjacent the interior surface of the electrode and such that the coolant passage is in fluid communication with a coolant supply. The substantially solid member extends from the second end of the hollow member and has a first flow restriction orifice extending therethrough. The first flow restriction orifice is fluid communication with the coolant passage for providing a high velocity jet of coolant to the interior surface of the electrode. When a blow-out condition occurs, the tube is not damaged because the high velocity coolant jet quenches the arc before it attaches to the tube.

The coolant passage and the first flow restriction orifice can be generally cylindrical and aligned along a centerline of the coolant tube. The first flow restriction orifice has a diameter which is smaller (e.g., three times smaller) than the diameter of the coolant passage, thereby facilitating the flow of a high velocity jet of coolant to the interior of the electrode.

At least one additional flow restriction orifices can extend through the substantially solid member. The additional flow restriction orifices are equiangularly spaced radially from the first flow restriction orifice. The diameter of the first flow restriction is smaller that the diameter of the coolant passage, and the diameter of each additional flow restriction orifice is smaller than the diameter of the first flow restriction orifice.

A mounting mechanism can be disposed on an external surface of the hollow member for securely positioning the coolant tube within the torch body. The mounting mechanism can comprises a threaded member for positioning the coolant tube adjacent the interior surface of the electrode and in fluid communication with the coolant supply.

The invention also features a method for manufacturing a coolant tube for use in a liquid-cooled electrode disposed in a plasma arc torch. A hollow member, which may be generally cylindrical and thin-walled, is formed. The hollow member has a first end, a second end and a coolant passage extending between the first and second ends. A substantially solid member extending from the second end of the hollow member is formed. A first flow restriction orifice extending through the substantially solid member is formed. The first flow restriction orifice, which may be substantially cylindrical, extends through the substantially solid member to provide a fluid communication path with the coolant passage. Also, at least one additional flow restriction orifices extending through the substantially solid member can be formed. A mounting mechanism can be formed on an external surface of the hollow member.

The invention also features a plasma arc torch including a torch body, a coolant supply fluid dynamically coupled to the body and a power supply electrically coupled to the body. A liquid-cooled electrode and a nozzle are mounted in the body so as to define a plasma chamber. The nozzle has a central passage and an exit orifice through which a transferred arc passes from the electrode to a workpiece.

A coolant tube comprising a hollow member and a substantially solid member provides coolant to an interior surface of the electrode. The hollow member has a first end, a second end and a substantially cylindrical coolant passage extending from the first end to the second end. The first end being secured within the body such that the coolant tube is disposed adjacent the interior surface of the electrode and such that the coolant passage is in fluid communication with a coolant supply. The substantially solid member extends from the second end and has at least one flow restriction orifice extending therethrough. Each flow restriction orifice has a diameter which is smaller that the diameter of the coolant passage. Each flow restriction orifice is in fluid communication with the coolant passage for providing at least one high velocity jet of coolant to the interior surface of the electrode. The coolant can be water.

The invention offers advantages over known coolant tubes. First, the invention does not become damaged during a blow-out condition, and is therefore more durable than known tubes. Second, the invention maintains or improves electrode life. Third, the invention is used with endmilled electrode which is more easily manufacturable than a hollowmilled electrode.

BRIEF DESCRIPTION OF THE DRAWINGS

This invention is described with particularity in the appended claims. The above and further advantages of this invention may be better understood by referring to the following description taken in conjunction with the accompanying drawings.

FIG. 3 is a table comparing the pit depth of electrodes using prior art coolant tubes with electrodes using coolant tubes incorporating the principles of the invention.

FIG. 4 is a table comparing the extent of damage during a blow-out condition for prior art coolant tubes with coolant tubes incorporating the principles of the invention.

DETAILED DESCRIPTION OF THE INVENTION

Figure 1:
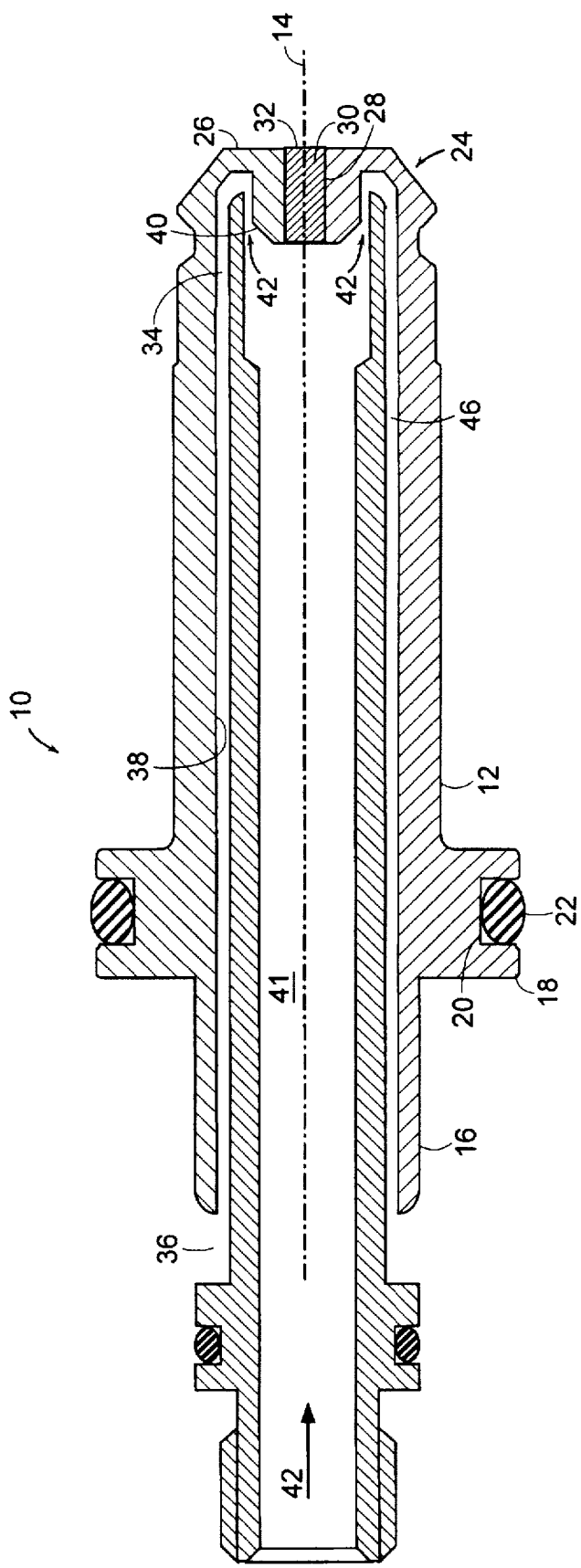
FIG. 1 is a cross-sectional view of a prior art coolant tube disposed in a hollowmilled electrode.

FIG. 1 illustrates a prior art coolant tube disposed in a hollowmilled electrode suitable for use in a high definition torch (e.g., the HD-1070 torch manufactured by Hypertherm, Inc). The electrode 10 has a cylindrical copper body 12. The body 12 extends along a centerline 14 of the electrode, which is common to the torch when the electrode is installed therein. The electrode can be replaceably secured in a cathode block (not shown) of the torch (not shown) by an interference fit. Alternatively, threads (not shown) can be disposed along atop end 16 of the electrode 10 for replaceably securing the electrode in the cathode block. A flange 18 has an outwardly facing annular recess 20 for receiving an o-ring 22 that provides a fluid seal. The bottom end 24 of the electrode tapers to a generally planar end surface 26.

A bore 28 is drilled through the bottom end 24 of the body 12 along the centerline 14. A generally cylindrical insert 30 formed of a high thermionic emissivity material (e.g., hafnium) is press fit in the bore 28. The insert 30 extends axially through the bottom end 24 to a hollow interior 34 of the electrode 10. An emission surface 32 is located along the end face of the insert 30 and exposable to plasma gas in the torch. The emission surface 32 can be initially planar or can be initially shaped to define a recess in the insert 30.

A coolant tube 36 is disposed in the hollow interior 34 adjacent the interior surface 38 of the body 12 and the interior surface 40 of the bottom end 24. The tube 36 is hollow, generally cylindrical, thin-walled and defines a large diameter coolant passage 41. By way of example, one such tube sold by Hypertherm, Inc. has a coolant passage diameter of 0.156 inches and is positioned 0.027 inches from the interior surface of the annular recess opposite the end face 26 of the electrode to provide sufficient cooling.

The tube 36 introduces a flow 42 of coolant through the passage 41, such as water, that circulates across the interior surface 40 of the bottom end 24 and along the interior surface 38 of the body 12. The electrode is hollowmilled in that it includes an annular recess 42 formed in the interior surface 40 of the bottom end 24. The recess 42 enhances the surface area of the electrode body exposed to the coolant and enhances the flow velocity across the interior surface 40 of the body 12. The flow 42 exits the electrode 10 via an annular passage 46 defined by the tube 36 and the interior surface 38 of the body 12. By way of example, when the tube 36 is used in a torch cutting at 100 amperes, the coolant flow is 1.0 gallons/minute and the coolant velocity is 7.0 feet/minute.

During the service life of the electrode 10, the insert material wears away forming a pit of increasing depth in the bore 28. When insert 30 has formed a pit of sufficient depth, a blow-out condition occurs. Due to the proximity of the tube 36 to the interior surface 40 of the bottom end 24 of the electrode 10, the arc attaches to the tube during a blow-out condition. The tube 36 becomes damaged by the arc and requires replacement.

Figures 2A, 2B:
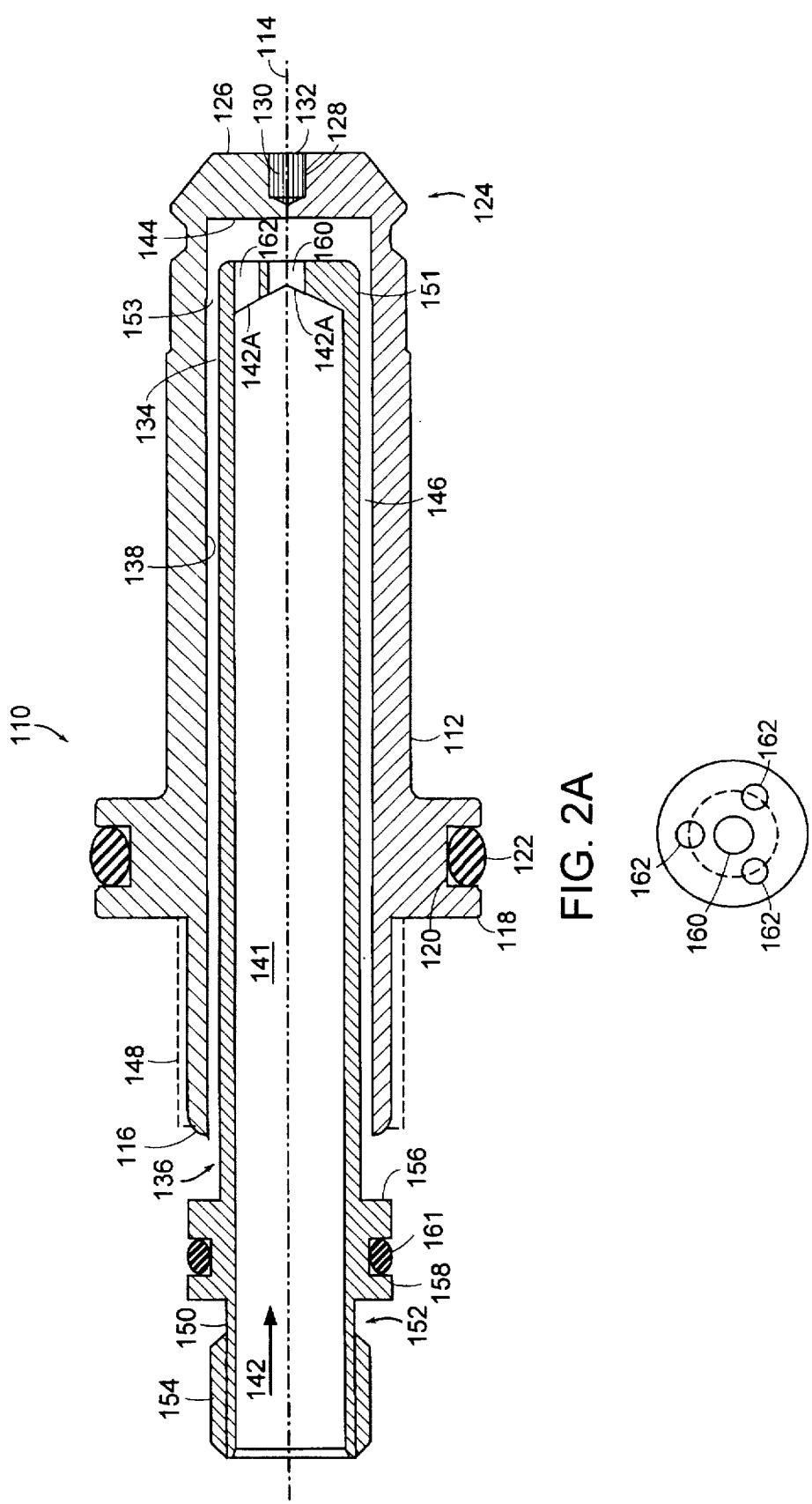
FIG. 2A a cross-sectional view of a coolant tube incorporating the principles of the invention disposed in an endmilled electrode.
FIG. 2B is an end view of the coolant tube of FIG. 2A.

FIG. 2A illustrates a coolant tube incorporating the principles of the invention. The coolant tube 136 is disposed in an endmilled electrode 110 suitable for use in a high definition torch. The electrode 110 has a cylindrical body 112 formed of a high thermal conductivity material such as copper. The body 112 extends along a centerline 114 of the electrode which is common to the torch. The electrode can be replaceably secured in the cathode block (not shown) by an interference fit, or threads 148 can be disposed along a top end 116 of the electrode 110. A flange 118 has an outwardly facing annular recess 120 for receiving an o-ring 122. The bottom end 124 of the electrode tapers to a generally planar end surface 126.

A generally cylindrical insert 130 formed of a high thermionic emissivity material (e.g., hafnium) is press fit in a bore 128 drilled in the bottom of the electrode 110. The insert 130 extends axially into the bottom end 124, but does not extend into a hollow interior 134 of the electrode 110. An emission surface 132 is located along the end face of the insert 130 and exposable to plasma gas in the torch. The emission surface 132 can be initially planar or can be initially shaped to define a recess.

The coolant tube 136 is disposed in the hollow interior 134 adjacent the interior surface 138 of the body and the planar interior surface 144 of the bottom end 124. The tube 136 extends along the centerline 114 of the electrode when it is installed therein. The tube 136 is generally cylindrical and includes a thin-walled, hollow member 150 and a substantially solid member 151. The hollow member 150 has a top end 152, a bottom end 153 and a generally cylindrical coolant passage 141 extending therebetween. The tube 136 can be replaceably secured in a cathode block of the torch by an interference fit. Alternatively, a mounting mechanism 154 (e.g., threads) can be disposed along the top end 152 for replaceably securing the tube in the cathode block. The tube 136 is mounted in the torch such that the top end 152 is in fluid communication with a coolant supply (not shown). A flange 156 has an outwardly facing annular recess 158 for receiving an o-ring 160 that provides a fluid seal.

Referring to FIGS. 2A-2B, the substantially solid member 151 extends from the bottom end 152 of the hollow member tube 150. A central flow restriction orifice 160 is formed in the substantially solid member 151. More specifically, the central orifice 160 extends through the substantially solid member 151 and is therefore in fluid communication with the coolant passage 141. The central orifice 160 is generally cylindrical is aligned with the coolant passage 141 along a centerline of the coolant tube 136.

Three additional flow restriction orifices 162 extend through the substantially solid member 151. The additional orifices 162 are generally cylindrical and equiangularly spaced radially from the central orifice 160. The central orifice 160 has a diameter which is smaller (e.g., three times smaller) than the diameter of the coolant passage 141, and the additional orifices 162 have a diameter which is smaller than the diameter of the central orifice 160. These orifices facilitate the flow of a high velocity jets 142a of coolant, such as water, to the interior surfaces 138, 144 of the electrode 110. Because the high velocity jets 142a results in improved cooling of the electrode, the spacing between the tube 136 and the interior surface 144 of the electrode can be increased.

A flow 142 of coolant travels through the passage 141 and passes through the orifices 160, 162 exiting the tube 136 as a plurality of high velocity jets 142a. The jets 142a impinge upon the interior surface 144 of the bottom end 124 of the electrode 110 and circulate along the interior surface 138 of the electrode body 112. The coolant flow exits the electrode 110 via an annular passage 146 defined by the tube 136 and the interior surface 138.

By way of example and without limitation, one such tube sold by Hypertherm, Inc. has a coolant passage diameter of 0.140 inches, a central orifice diameter of 0.047 inches and additional orifice diameters of 0.031 inches. When the tube is used in a high definition torch cutting at 100 amperes, the coolant flow is 0.75 gallons/minute and the coolant velocity is 24.8 feet/minute. The spacing between the bottom end 153 of the tube 136 and the interior surface 144 of the electrode is 0.050 inches.

FIG. 3 is a comparison of pit depth for electrodes using prior art coolant tubes with electrodes using coolant tubes incorporating the principles of the invention. A high definition torch was fitted with prior art coolant tubes disposed in hollowmill and endmill electrodes and the claimed coolant tube (referred to as HyJet) disposed in an endmill electrode. The torch was operated at 100 amperes using four and sixty second cutting cycles. The torch was operated for 600 cycles for the four second cutting cycle and 180 cycles for the sixty second cycle. This repeated use of each electrode caused the insert material to wear away, thereby forming a pit in the electrode insert. As shown, the insert of the electrodes using the prior art tubes exhibited more deterioration (i.e., larger pit depths) than the electrodes using the HyJet tube. Thus, the electrodes using the prior art tubes are more likely to experience a blow-out condition than electrodes using the HyJet tube.

FIG. 4 is a comparison of the extent of damage during a blow-out condition for prior art coolant tubes with coolant tubes incorporating the principles of the invention. As explained above, a high definition torch was fitted with prior art coolant tubes disposed in hollowmill and endmill electrodes and the HyJet tube disposed in an endmill electrode. The torch was operated at 100 amperes using four and sixty second cutting cycles until the electrode was completely worn out (i.e., a blow-out condition occurred). As shown, the prior art tubes exhibited damage from the blow-out condition. In contrast, the HyJet tube was not damaged because the high velocity coolant jets quench the arc before it attaches to the tube.

Figure 5:
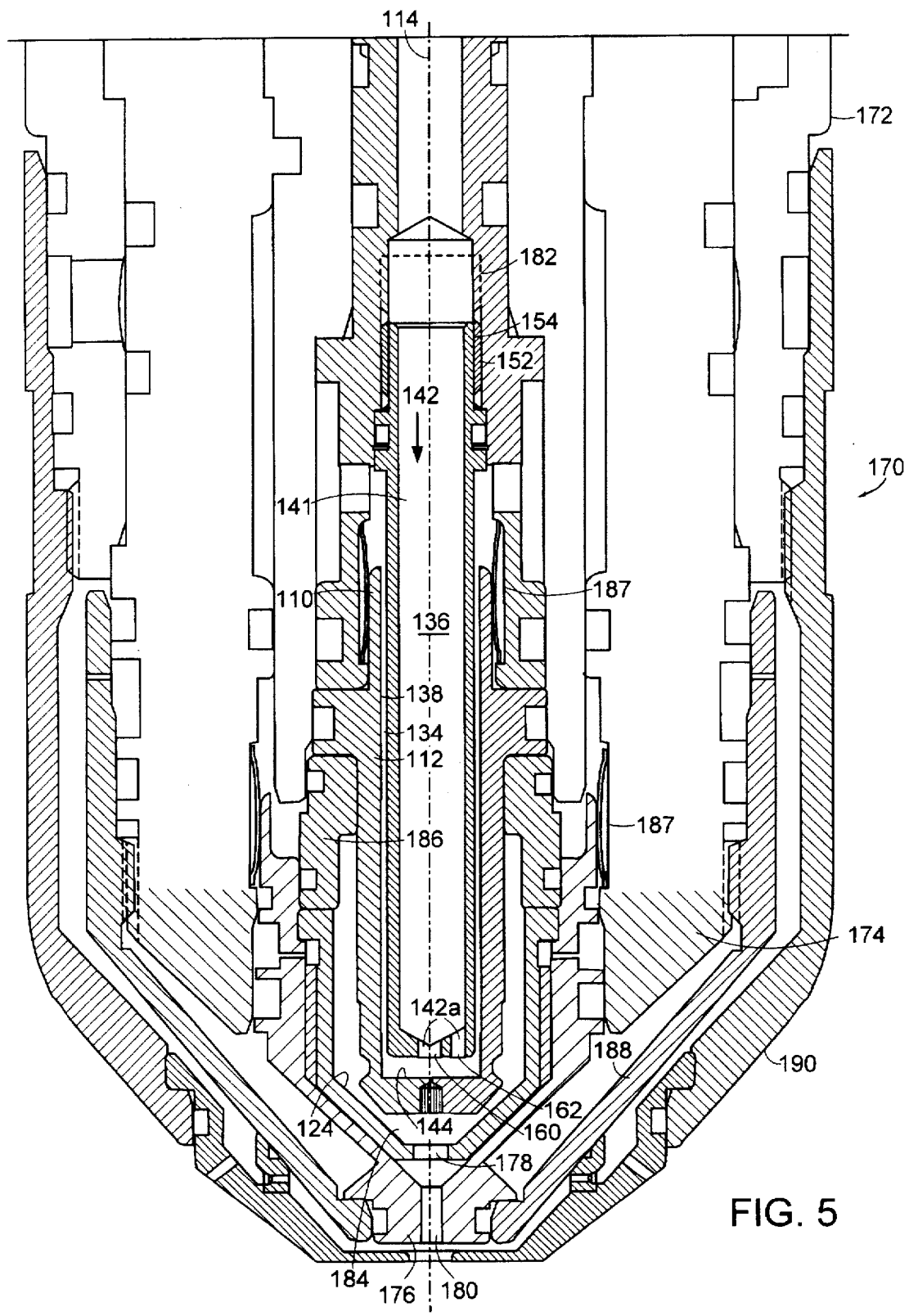
FIG. 5 is a partial cross-sectional view of a plasma arc torch incorporating the principles of the invention.

FIG. 5 shows a high definition plasma arc torch 170 that can be utilized to practice the invention. The torch 170 has a generally cylindrical body 172 which includes electrical connections, passages for cooling fluids and arc control fluids. An anode block 174 is secured in the body 172. A nozzle 176 is secured in the anode block and has a central passage 178 and an exit orifice 180 through which an arc can transfer to a workpiece (not shown). The electrode 110 is secured in a cathode block 182 in a spaced relationship relative to the nozzle 176 to define a plasma chamber 184. Plasma gas fed from a swirl ring 186 is ionized in the plasma chamber to form an arc. Centering bands 187 (e.g., Louvertac brand manufactured by AMP) are positioned in the cathode block and the anode block for concentrically axially aligning the electrode and nozzle respectively. A water-cooled cap 188 is threaded onto the lower end of the anode block, and a multi-piece secondary cap 190 is threaded onto the torch body 172. The secondary cap 190 acts as a mechanical shield against splattered metal during piercing or cutting operations.

The coolant tube 136 is disposed in the hollow interior 134 of the electrode 110. The tube 136 extends along the centerline 114 of the electrode and the torch when it is installed in the torch. The tube 136 can be replaceably secured in a cathode block 182 by the screw thread 154. The tube 136 is mounted in the torch such that the top end 152 is in fluid communication with a coolant supply (not shown). The flow 142 of coolant travels through the passage 141 and passes through the orifices 160, 162 exiting the tube 136 as a plurality of high velocity jets 142a. The jets 142a impinge upon the interior surface 144 of the bottom end 124 of the electrode 110 and circulate along the interior surface 138 of the electrode body 112. The coolant flow exits the electrode 110 via an annular passage 134 defined by the tube 136 and the interior surface 138.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A coolant tube for use in a liquid-cooled electrode in a plasma arc torch having a torch body and a coolant supply fluid dynamically coupled to the body, the tube comprising:
   a hollow member having a first end, a second end and a coolant passage extending from the first end to the second end, the first end being secured within the torch such that the coolant passage is in fluid communication with the coolant supply; and
   a substantially solid member extending from the second end and having a primary flow restriction orifice and at least one additional flow restriction orifice extending therethrough, the primary flow restriction orifice and each additional flow restriction orifice being in fluid communication with the coolant passage and an interior surface of the electrode for providing a plurality of high velocity jets of coolant to the interior surface of the electrode.

2. The coolant tube of claim 1 wherein the coolant passage and the primary flow restriction orifice are aligned along a centerline of the coolant tube.

3. The coolant tube of claim 1 wherein the coolant passage and the primary flow restriction orifice are substantially cylindrical.

4. The coolant tube of claim 3 wherein the primary flow restriction orifice has a diameter which is smaller than the diameter of the coolant passage.

5. The coolant tube of claim 3 wherein the primary flow restriction orifice has a diameter which is at least three times smaller than the diameter of the coolant passage.

6. The coolant tube of claim 1 wherein each additional flow restriction orifice is aligned parallel to the primary flow restriction orifice.

7. The coolant tube of claim 6 wherein the coolant passage and the primary flow restriction orifice are aligned along a centerline of the coolant tube, and wherein the additional flow restriction orifices are equiangularly spaced radially from the primary flow restriction orifice.

8. The coolant tube of claim 6 wherein the coolant passage, the primary flow restriction orifice and each additional flow restriction orifice are substantially cylindrical, and wherein each additional flow restriction orifice has a diameter which is smaller than the diameter of the coolant passage.

9. The coolant tube of claim 8 wherein each additional flow restriction orifice has a diameter which is smaller than the diameter of the primary flow restriction orifice.

10. The coolant tube of claim 1 further comprising a mounting mechanism disposed on an external surface of the hollow member for securely positioning the coolant tube in the torch adjacent the interior surface of the electrode.

11. A coolant tube for use in a liquid-cooled electrode in a plasma arc torch having a torch body and a coolant supply fluid dynamically coupled to the body, the tube comprising:
   a hollow generally cylindrical thin-walled member having a first end, a second end and a generally cylindrical coolant passage extending between the first and second ends, the first end being secured within the torch such that the coolant tube is disposed adjacent an interior surface of the electrode and such that the coolant passage is in fluid communication with the coolant supply; and
   a substantially solid member extending from the second end and having a plurality of cylindrical flow restriction orifices extending therethrough, each flow restriction orifice having a diameter which is smaller than the diameter of the coolant passage, each flow restriction orifice being in fluid communication with the coolant passage for providing a plurality of high velocity jets of coolant to the interior surface of the electrode.

12. The coolant tube of claim 11 wherein the plurality of flow restriction orifices comprises a primary flow restriction orifice aligned with the coolant passage along a centerline of the coolant tube, and a plurality of additional flow restriction orifices equiangularly spaced radially from the primary flow restriction orifice.

13. The coolant tube of claim 12 wherein the primary flow restriction orifice has a diameter which is smaller than the diameter of the coolant passage, and wherein each additional flow restriction orifice has a diameter which is smaller than the diameter of the primary flow restriction orifice.

14. A method for manufacturing a coolant tube for use in a liquid-cooled electrode in a plasma arc torch, comprising the steps of:
   forming a hollow substantially cylindrical thin-walled member having a first end, a second end and a coolant passage extending between the first and second ends;
   forming a substantially solid member extending from the second end of the hollow member; and
   forming a primary flow restriction orifice and at least one additional flow restriction orifice extending through the substantially solid member to provide a plurality of fluid communication paths with the coolant passage.

15. The method of claim 14 wherein the coolant passage and the primary flow restriction orifice are substantially cylindrical, and wherein the primary flow restriction orifice has a diameter which is smaller than the diameter of the coolant passage.

16. The method of claim 15 further comprising the step of forming a plurality of additional flow restriction orifices extending through the substantially solid member.

17. The method of claim 16 wherein the primary flow restriction orifice and the coolant passage are aligned along a centerline of the coolant tube, and the additional flow restriction orifices are equiangularly spaced radially from the primary flow restriction orifice.

18. The method of claim 16 wherein the additional flow restriction orifices each have a diameter which is smaller than the diameter of the primary flow restriction orifice.

19. The method of claim 14 further comprising the step of forming a mounting member on an external surface on a first end of the thin-walled member.

20. A plasma arc torch including a torch body, a coolant supply fluid dynamically coupled to the body, and a power supply electrically coupled to the body, the torch comprising:

- a liquid-cooled electrode mounted in the body;
- a nozzle mounted in the body adjacent the electrode and having a central passage and an exit orifice through which a transferred arc passes to the workpiece; and
- a coolant tube for providing coolant to an interior surface of the electrode, the tube comprising:
  - (a) a hollow thin-walled member having a first end, a second end and a substantially cylindrical coolant passage extending from the first end to the second end, the first end being secured within the body such that the coolant tube is disposed adjacent the interior surface of the electrode and such that the coolant passage is in fluid communication with a coolant supply; and
  - (b) a substantially solid member extending from the second end and having a plurality of generally cylindrical flow restriction orifices extending therethrough, each flow restriction orifice having a diameter which is smaller than the diameter of the coolant passage, each flow restriction orifice being in fluid communication with the coolant passage for providing a plurality of high velocity jets of coolant to the interior surface of the electrode.

* * * * *